US010296381B2

(12) United States Patent
Ryu et al.

(10) Patent No.: US 10,296,381 B2
(45) Date of Patent: May 21, 2019

(54) METHOD AND SYSTEM FOR ANALYZING TASK GROUP SCHEDULABILITY FOR HARD REAL-TIME SCHEDULING

(71) Applicant: AGENCY FOR DEFENSE DEVELOPMENT, Daejeon (KR)

(72) Inventors: Dong-Kuk Ryu, Seoul (KR); Sang-Il Lee, Seoul (KR); Hyun-Wook Jin, Seoul (KR); Yin-Goo Yim, Seoul (KR); Hyun-Chul Jo, Seoul (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 171 days.

(21) Appl. No.: 15/440,052

(22) Filed: Feb. 23, 2017

(65) Prior Publication Data
US 2017/0255488 A1 Sep. 7, 2017

(30) Foreign Application Priority Data

Mar. 4, 2016 (KR) ........................ 10-2016-0026111

(51) Int. Cl.
*G06F 9/48* (2006.01)
*G06F 11/36* (2006.01)

(52) U.S. Cl.
CPC ........ *G06F 9/4887* (2013.01); *G06F 11/3696* (2013.01)

(58) Field of Classification Search
CPC ........................... G06F 9/4887; G06F 11/3696
See application file for complete search history.

(56) References Cited

U.S. PATENT DOCUMENTS

| 8,340,080 B2 * | 12/2012 | Huang | .................... H04L 12/66 |
| | | | 370/352 |
| 2008/0148273 A1 * | 6/2008 | Huang | .................. G06F 9/4887 |
| | | | 718/104 |

(Continued)

FOREIGN PATENT DOCUMENTS

| JP | 2000-047884 A | 2/2000 |
| KR | 2013-0006587 A | 1/2013 |
| KR | 2013-0066900 A | 6/2013 |

OTHER PUBLICATIONS

Hyungchul Kim, "Design and Implementation of Hard Real-Time Operating System for Redundant Control System," master's thesis of Inha University, 2004.

(Continued)

*Primary Examiner* — Camquy Truong
(74) *Attorney, Agent, or Firm* — LRK Patent Law Firm (57) ABSTRACT

The method and system for analyzing schedulability configured for a computer for operating an operating system that supports a task group of hard real-time scheduling or a user processor operated in an embedded circuit. The system includes an operating system including a file system and a kernel, and generating non-periodic real-time task information and periodic real-time task information from the file system and the kernel, a tool for testing hard real-time schedulability that collecting the non-periodic real-time task information by applying a first predetermined scheduling algorithm and determining schedulability of a reserved resource for a real-time task group including the non-periodic real-time task information through a second predetermined scheduling algorithm.

10 Claims, 6 Drawing Sheets

(56) References Cited

U.S. PATENT DOCUMENTS

2008/0155537 A1\* 6/2008 Dinda ................ G06F 9/4887
718/1
2014/0122665 A1 5/2014 Thomas

OTHER PUBLICATIONS

Jin-Seok Kim, "An On-line Scheduling Algorithm for Hard Aperiodic Tasks," Dep. of Computer, Information and Communication Engineering Graduate School, Kangwon National University, 2001.
Junghoon Choi, "Implementation of Mixed Real-Time Scheduler for Efficient Task Scheduling on RTlinux," master's thesis of Suwon University, 1999.
Hyeon Hui Park et al., "Static Worst-Case Execution Time Analysis Tool for Scheduling Primitives about Embedded OS," Oct. 2007, p. 271-281, V13-5, Journal of KIISE, JOK.

\* cited by examiner

METHOD AND SYSTEM FOR ANALYZING TASK GROUP SCHEDULABILITY FOR HARD REAL-TIME SCHEDULING

CROSS REFERENCE TO RELATED APPLICATION

This application claims the benefit of Korean Patent Application No. 10-2016-0026111, filed Mar. 4, 2016, which is hereby incorporated by reference in its entirety into this application.

BACKGROUND OF THE INVENTION

1. Technical Field

The present invention relates generally to a data processing technique of task scheduling. More particularly, the present invention relates to method and system for analyzing schedulability configured for a computer capable of operating an operating system that supports a hard real-time scheduling task group or a user processor operated in an embedded circuit.

2. Description of the Related Art

A real-time system refers to a system in which performance accuracy and an execution time within an end time of a task are used as a criterion for judging appropriate operation of the entire system. Operating systems for real-time systems may be classified into two types. First, a real-time operating system that only supports a real-time system. Second, an extended general purpose operating system in which a real-time scheduler and non real-time scheduler are combined. Among these operating systems, users who use Unix-like real-time systems can use all services provided from Unix system. In addition, cost and time may be saved by its familiar development environment.

However, the extension of Unix-like operating systems is problematic in that it is impossible for a kernel of the Unix operating system to be preempted, and predictability is insufficient due to low accuracy of a timer. In order to solve the above problems, there is provided a method of following a POSIX.lb standard, a method of utilizing operating system characteristics, or a method of combining the above two methods.

Generally, a Linux system supports soft real-time systems with a part of a POSIX.lb standard support. At present, RTinux has been developed to support hard real-time systems; however, various programming interfaces and resources for a scheduler are still insufficient.

Particularly, improvements supporting real-time Linux system are used in a wide embedded system. For example, a recent extension of process scheduling includes a resource reservation framework (in other words, cgroup) for task groups. Efforts are being made to produce improvements supporting real-time system, and a Linux system will become a potential operating system for hard real-time application in the near future. However, there are still many points to be improved since general purpose operating systems such as Linux are not designed for hard real-time systems.

In addition, scheduling tests of cgroup are overly optimistic. A current scheduling implementation of a Linux task group guarantees that task groups do not use more than reserved central processing unit (CPU) resources. Further, when task groups are not supposed to use 100% of CPU resources, scheduling tests are omitted. However, it is not possible to guarantee that all task groups will use as much as the reserved resources in every period.

Therefore, in order to make all task groups to be always able to use a reserved resource in every period, first, the worst case scenario for given task groups may be identified.

In addition, a scheduling test of cgroup does not consider a real-time scheduler with high priority (for example, SCHED_DEADLINE). A deadline scheduling policy (SCHED_DEADLINE) has top priority and has higher priority than a non-periodic scheduler that is a resource management subject of cgroup. Therefore, a cgroup using schedulers that have lower priority (for example, SCHED_FIFO and SCHED_RR) compared with the SCHED_DEADLINE has to consider reserved resources made by SCHED_DEADLINE while scheduling testing. However, the current implementation does not take this into account.

Thus, operating systems such as Linux need a scheduling test algorithm that tests for hard real-time system worst case scenarios.

SUMMARY OF THE INVENTION

The present invention has been made keeping in mind the above problems occurring in the related art, and an object of the present invention is to provide a method and system for analyzing task group schedulability for a hard real-time scheduling, wherein the method and system are capable of implementing an algorithm considering the worst case scenario of given task groups.

In addition, another object of the present invention is to provide a method and system for analyzing task group schedulability for a hard real-time scheduling, wherein the method and system are capable of implementing a scheduling test algorithm considering the worst case scenario of given task groups.

In order to accomplish the above object, the present invention provides a method of analyzing task group schedulability for hard real-time scheduling.

The method for analyzing schedulability uses a system for analyzing task group schedulability for hard real-time scheduling, the system including: an operating system including a file system and a kernel, and generating non-periodic real-time task information and periodic real-time task information and periodic real-time task group information including the non-periodic real-time task information from the file system and the kernel; and hard real-time schedulability testing tool collecting the non-periodic real-time task information by applying a first predetermined scheduling algorithm and determining schedulability of a reserved resource for a real-time task group including the non-periodic real-time task information through a second predetermined scheduling algorithm.

In addition, the tool for testing hard real-time schedulability may include: a first module for collecting non-periodic real-time task information, the first module collecting real-time task group information including the non-periodic real-time task information; a second module for collecting periodic real-time task information, the second module collecting the periodic real-time task information; and a third module for testing schedulability, the third module determining the schedulability of the reserved resource for the real-time task group including the periodic real-time task information through the real-time task information and the periodic real-time task information.

In addition, the first algorithm may collect real-time task information including priorities by using a file system capable of accessing scheduling information including a period and an execution time of a task, or by using a system call. A Linux system used for implementing the present invention uses a proc file system capable of accessing scheduling information and a system call that obtains a period and an execution time of a task, the task uses dead line scheduling policy that has higher priority than a scheduler supporting a task group scheduling.

In addition, the second algorithm may determine the schedulability of the reserved resource for the real-time task group by using the periodic real-time task information including a period of an execution time of the periodic real-time task and priority information within the real-time task group, and by using the real-time task information allowed to a CPU.

In addition, the second module may explore an executing process from folders of the file system, determine if a task policy of the folder matches to a deadline scheduling policy (SCHED_DEADLINE), and if so, collect a period and an execution time of a task that corresponds to the executing process.

In addition, the first module may explore the real-time task group in the file system, explore priority information of a task within the real-time task group, and add the explored real-time task group to a schedulability analysis subject set.

In addition, the periodic real-time task group determines the priority of the task group based on the priority of the non-periodic real-time task in the group. And the periodic real-time task group selects the highest priority and the lowest priority of the non-periodic real-time task in the group as the maximum and minimum priority of the periodic real-time task group.

In addition, the task group capable of preempting the CPU of the schedulability analysis object comprises all of the periodic real-time task groups having a maximum priority higher than the minimum priority of the current schedulability analysis object in the set of performance schedulability analysis objects, and the periodic real-time task group is sorted in a descending order based on the highest-priority information In addition, the periodic real-time task group may be sorted in a descending order based on the priority information.

In addition, the third module may determine whether the non-periodic real-time task information and the periodic real-time task information correspond to the schedulability analysis subject set or to a schedulability calculation subject set, add the determined subject set to the corresponding subject set, perform a schedulability analysis algorithm by exploring the schedulability analysis subject set from beginning to end, determine the schedulability of the schedulability analysis subject set at the last schedulability analysis subject set, and when the schedulability analysis subject set is determined to be impracticable, determine that the schedulability of the reserved resource for the real-time task group is impracticable.

In addition, each schedulability analysis subject in the schedulability analysis subject set is always a schedulability analysis operation object having a relatively high priority, the schedulability analysis operation is performed by calculating other schedulability analysis objects having the highest priority higher than the minimum priority of the schedulability analysis subject in the schedulability object analysis set as CPU resource usage in the worst case.

In addition, the third module may determine the reserved resource schedulability for the real-time task group by comparing a remaining time of a preempted time that is preempted by the real-time task group including the non-periodic real-time task allowed to a CPU or the real-time task group including non-periodic real-time task with a higher priority than the periodic real-time task, and the periodic real-time task, with an execution time required to execute the corresponding real-time group.

The real-time task group and the periodic real-time task can be operated within only a CPU when the real-time task group and the periodic real-time task is operated in a multi-core environment. And the CPU includes the plural of task groups or periodic real-time tasks. And it is presumed that the real-time task group and the periodic real-time task are operated under an environment which they are not migrated into other CPU except the allowed CPU. The migration means that the tasks are moved into other CPU.

In addition, the execution time of the real-time task group may be calculated by the following formula $$\sum_{k=1}^{n-1} \lceil p_n \div p_k \rceil \times e_k <== p_n - e_n$$

Wherein, when k and n are natural numbers, a priority order of each task is shown in descending order. In other words, a task having top priority is expressed as $T_1$. Therefore, $T_k$ means a task having a kth priority. As the value of k increases, a task having kth priority has relatively low priority. When a current subject of schedulability analysis has an nth priority, then a corresponding task is expressed as $T_n$, $p_n$ refers to a period of $T_n$, and $e_n$ refers to an execution time of $T_n$. A task group or a periodic real-time task having higher priority than the schedulability analysis subject is expressed as $T_k$. A period of $T_k$ is expressed as $p_k$, and an execution time of $T_k$ is expressed as $c_k$. Wherein, k is a natural number between 1 and n).

According to another aspect, there is provided a method of analyzing task group schedulability for hard real-time scheduling, wherein the method uses an operating system including a file system and a kernel and is performed by a tool for testing hard real-time schedulability, the method includes: generating non-periodic real-time task information and periodic real-time task information and periodic real-time task group information including the non-periodic real-time task information from the file system and the kernel; collecting non-periodic real-time task information by applying a first predetermined scheduling algorithm; and determining schedulability of a reserved resource for a real-time task group including the non-periodic real-time task information by applying a second predetermined scheduling algorithm.

According to the present invention, when all selected tasks use all run times of the task group, there is provided an algorithm that detects the worst case scenario for the given task groups by effectively identifying a task combination that is the most difficult feature to be guaranteed by CPU resources. Thus, the present invention is capable of detecting if all task groups are always able to use reserved CPU resources.

In addition, another effect of the present invention is that an actual scheduling test is performed by using a task combination provided from the previous algorithm.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

Like numbers refer to like elements throughout the description of the figures.

It will be understood that, although the terms first, second, etc. may be used herein to describe various elements, these elements should not be limited by these terms. These terms are only used to distinguish one element from another.

For example, a first element could be termed a second element, and, similarly, a second element could be termed a first element, without departing from the scope of example embodiments of the present invention. As used herein, the term "and/or," includes any and all combinations of one or more of the associated listed items.

Unless otherwise defined, all terms (including technical and scientific terms) used herein have the same meaning as commonly understood by one of ordinary skill in the art to which example embodiments belong.

It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

A method and system for analyzing task group schedulability for hard real-time scheduling according to an embodiment of the present invention will now be described more fully hereinafter with reference to the accompanying drawings.

Figure 1:
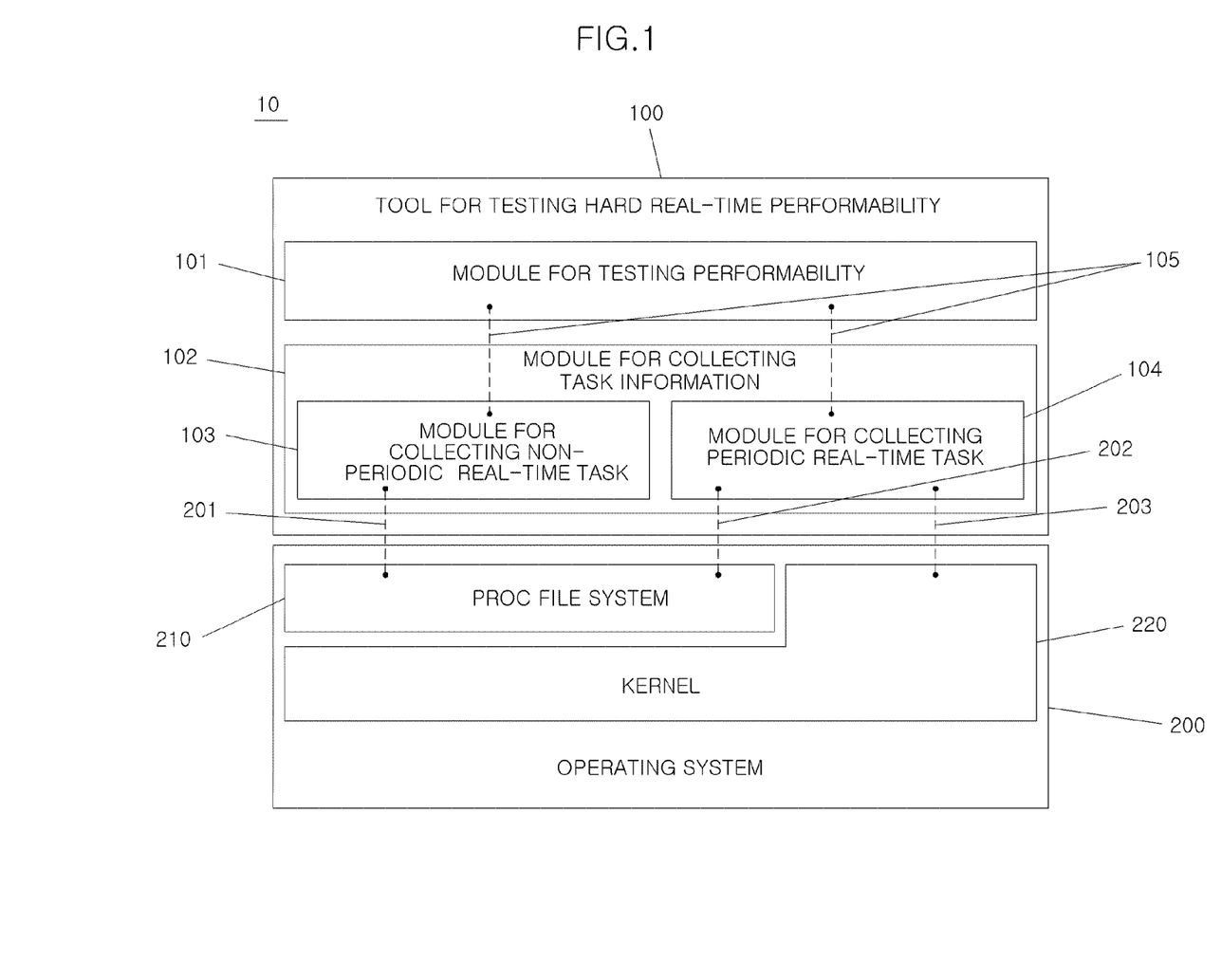
FIG. 1 is an overall configuration diagram of a system for analyzing schedulability according to an embodiment of the present invention.

FIG. 1 is an overall configuration diagram of a system for analyzing schedulability 10 according to an embodiment of the present invention. Referring to FIG. 1, the system for analyzing the schedulability 10 according to the embodiment of the present invention may be configured for a computer capable of operating an operating system that supports hard real-time task group or a user processor that is operated in an embedded circuit. In FIG. 1, Linux system is used as a general purpose operating system to implement the present invention.

In other words, referring to FIG. 1, the overall configuration of the system for analyzing the schedulability 10 according to the embodiment of the present invention includes: a proc file system; an operating system 200 that supports a system call, the system call capable of obtaining a period and/or an execution time of a task having high priority, and using a periodic real-time scheduling policy; and a tool for testing hard real-time schedulability 100.

The tool for testing the hard real-time schedulability 100 includes: a module for collecting task information 102 for the schedulability test; and a third module for testing schedulability 101 that determines the schedulability by applying schedulability determination algorithm to the collected information.

The module for collecting task information 102 includes: a first module for collecting non-periodic real-time task group information 103, wherein the first module collects a non-periodic real-time task and task group information including the non-periodic real-time task; and a second module for collecting periodic real-time task information 104, wherein the second module collects periodic real-time task information.

The first module 103 collects a real-time task group including the non-periodic real-time scheduling task that uses a resource by currently reserving thereof by using the proc file system of the operating system 200, and a priority of the non-periodic real-time task (201).

The second module 104 collects real-time task information that is scheduled by a deadline scheduling policy (SCHED_DEADLINE) by using the proc file system of the operating system 200 (202) and a period and an execution time of the real-time task through a system call 203 of the kernel 220.

The information obtained by the first module 103 becomes a scheduling analysis subject applied to a scheduling algorithm of the third module 101. The information obtained by the second module 104 is used for calculating the scheduling algorithm of the third module 101.

The third module 101 collects the scheduling analysis subject applied to the scheduling algorithm through the module for collecting task information 102 and task information that has higher priority than the scheduling analysis subject applied to the scheduling algorithm to calculate the scheduling algorithm (105)

Figure 2:
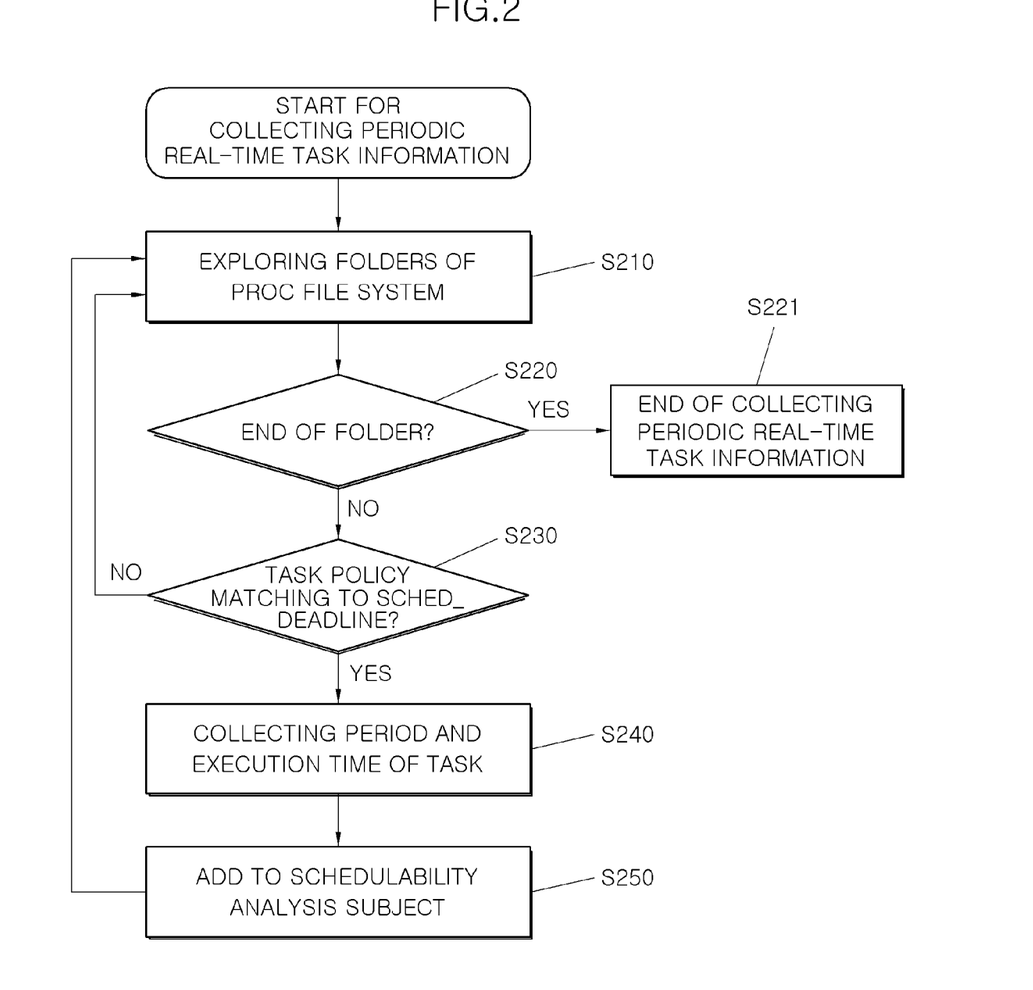
FIG. 2 is a flow chart of collecting periodic real-time scheduling task information used for analyzing the schedulability according to the embodiment of the present invention.

FIG. 2 is a flow chart of collecting periodic real-time scheduling task information used for analyzing the schedulability according to the embodiment of the present invention of FIG. 1. Referring to FIG. 2, the periodic real-time task information used for analyzing the schedulability is collected by using the proc file system (210 in FIG. 1)

In order to collect the periodic real-time task information, first, an executing process within a folder of the proc file system 210 is explored, then the exploration process is finished when there is no remaining executing process (S210, S220, and S221).

In step S220, when the folder includes information of the executing process, a task policy included in the information is matches to a deadline scheduling policy (SCHED_DEADLINE) that is higher than that of the scheduling analysis subject applied to the scheduling algorithm (S230).

In step S230, when the task policy matches, the corresponding executing process is sorted to the real-time scheduling task that is used for analyzing the schedulability, and a period and execution time thereof are collected (S240). Then, the above information is added to a schedulability calculation subject set (S250). After, steps S210 to S250 are repeated. The exploration process is performed until all of the folders within the proc file system are explored.

Figure 3:
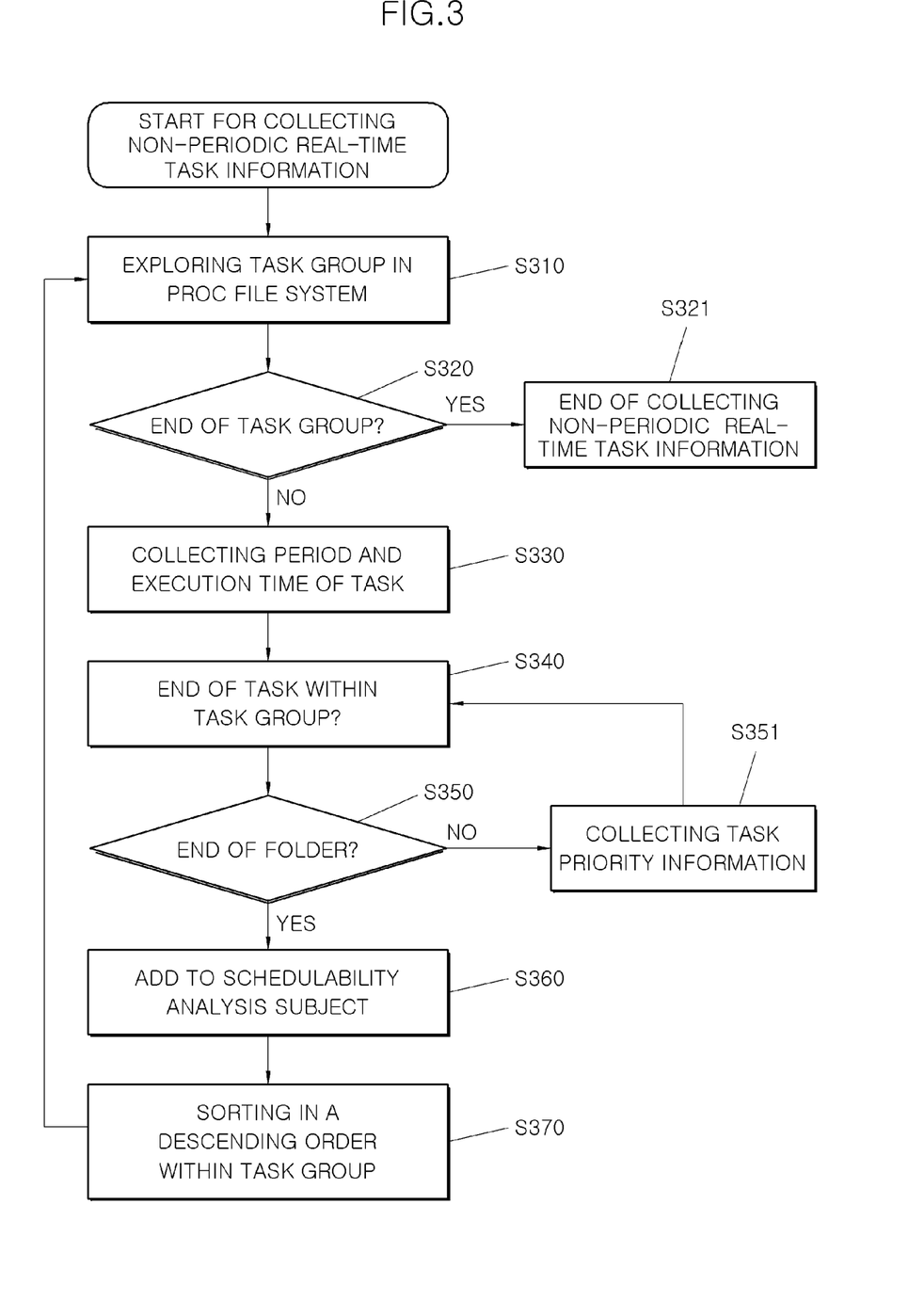
FIG. 3 is a flow chart of collecting a real-time task group including a non periodic real-time scheduling task and non periodic real-time scheduling task information that become a scheduling analysis subject according to the embodiment of the present invention.

FIG. 3 is a flow chart of collecting a real-time task group including a non-periodic real-time scheduling task and non-periodic real-time scheduling task information that become a scheduling analysis subject according to the embodiment of the present invention. Referring to FIG. 3, the proc file system (210 in FIG. 1) refers to a proc file system including a real-time task group, and the real-time task group is explored by sequentially exploring folders of the proc file system (S310).

Step S310 is performed until all of the real-time task groups are explored. Then, a period and an execution time of each task are collected through the proc file system (S320 and S321). Herein, when the exploration of the real-time task group is finished (S320), the information collection process is ended (S321).

Alternatively, while the exploration of the real-time task group is performed (S320), a process ID of each task included in the real-time task group is collected (S330).

Then, priorities of the tasks are obtained by using the above information through the proc file system (S350 and S351).

Of course, priorities of the tasks included in each task group are stored, and the above steps are repeated until the end of the last folder (S340, S350, and S351).

The real-time task group including the non-periodic real-time scheduling task and non-periodic real-time task information are added to the schedulability analysis subject set, the schedulability analysis subject set being applied to the schedulability analysis algorithm (S360). The added task groups are sorted in a descending order based on the priority information (S370).

Figure 4A:
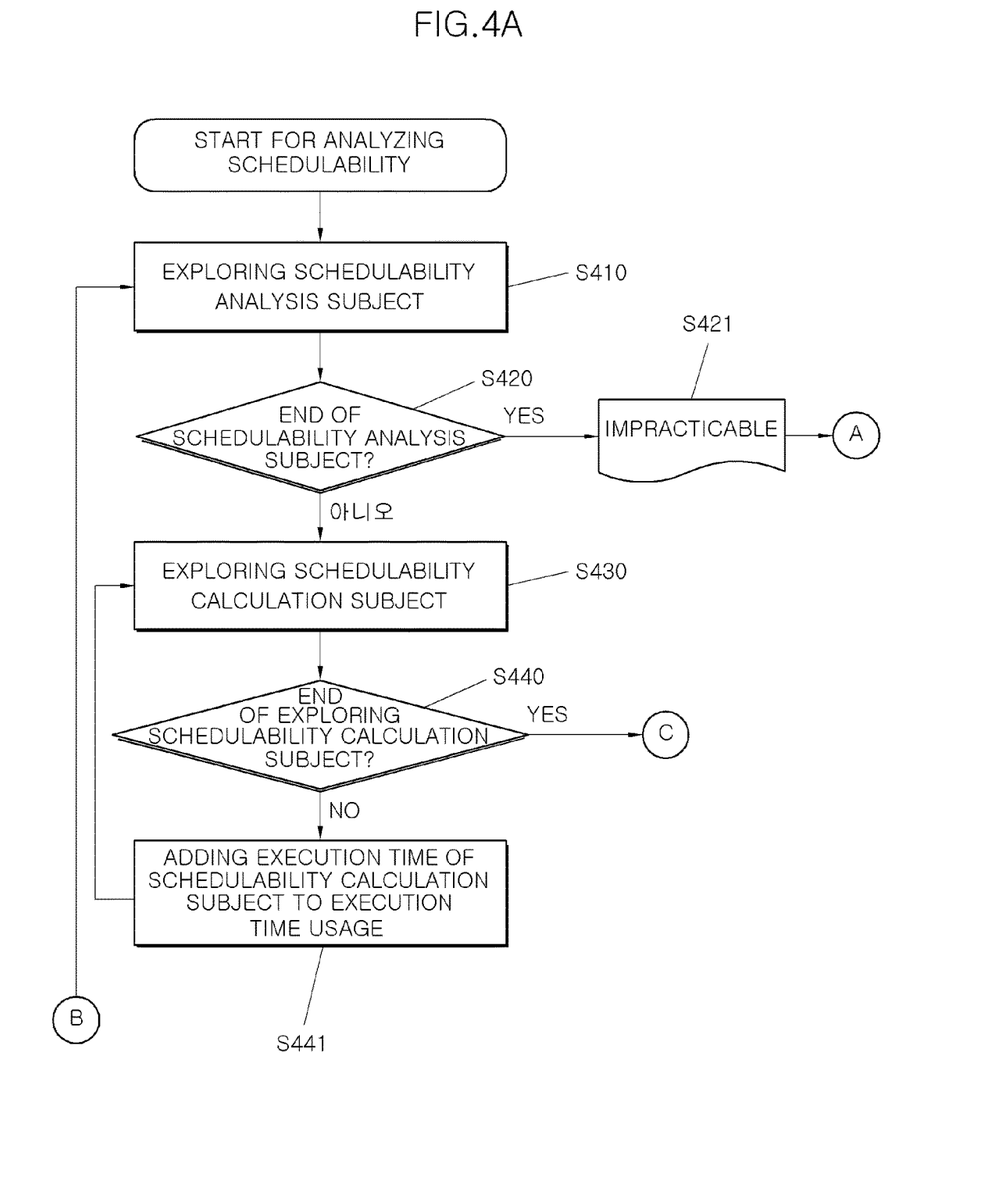
FIGS. 4A-4C are flow charts of the schedulability analysis according to the embodiment of the present invention.
Figure 4B:
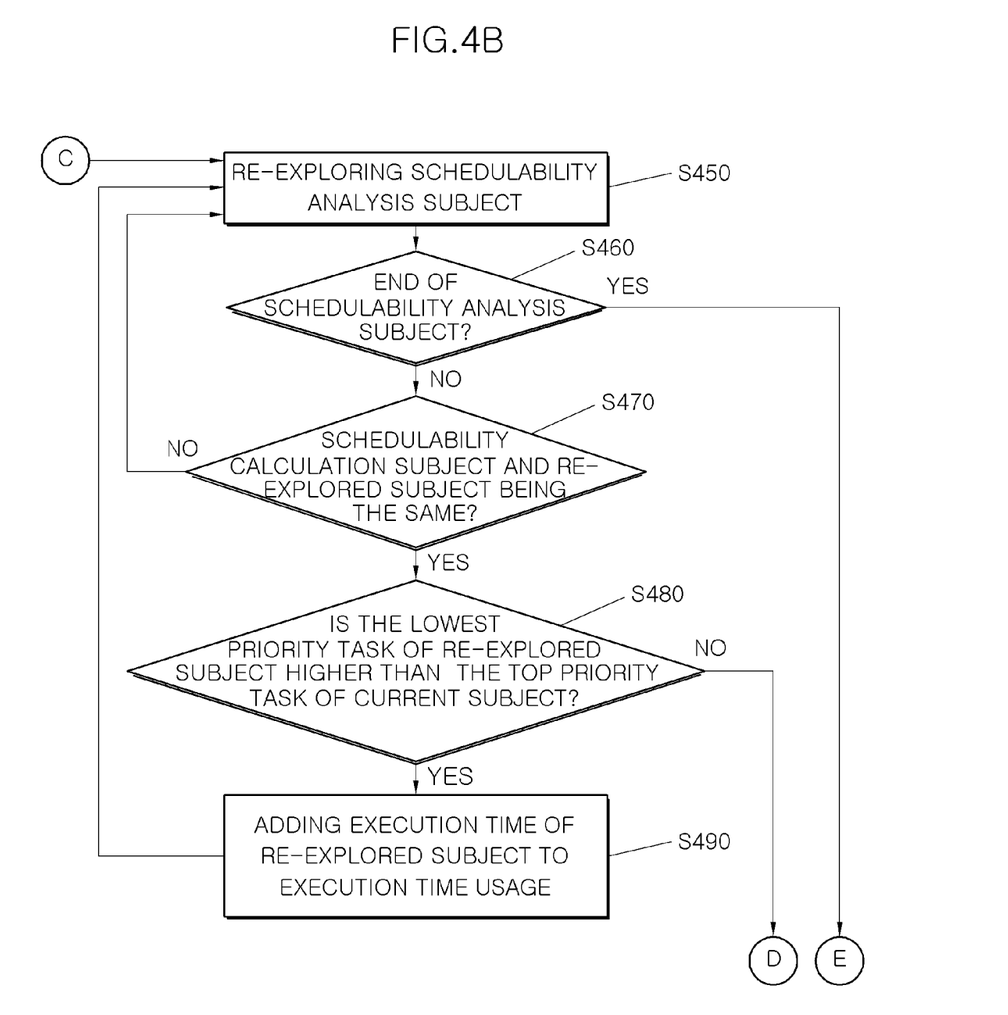
Figure 4C:
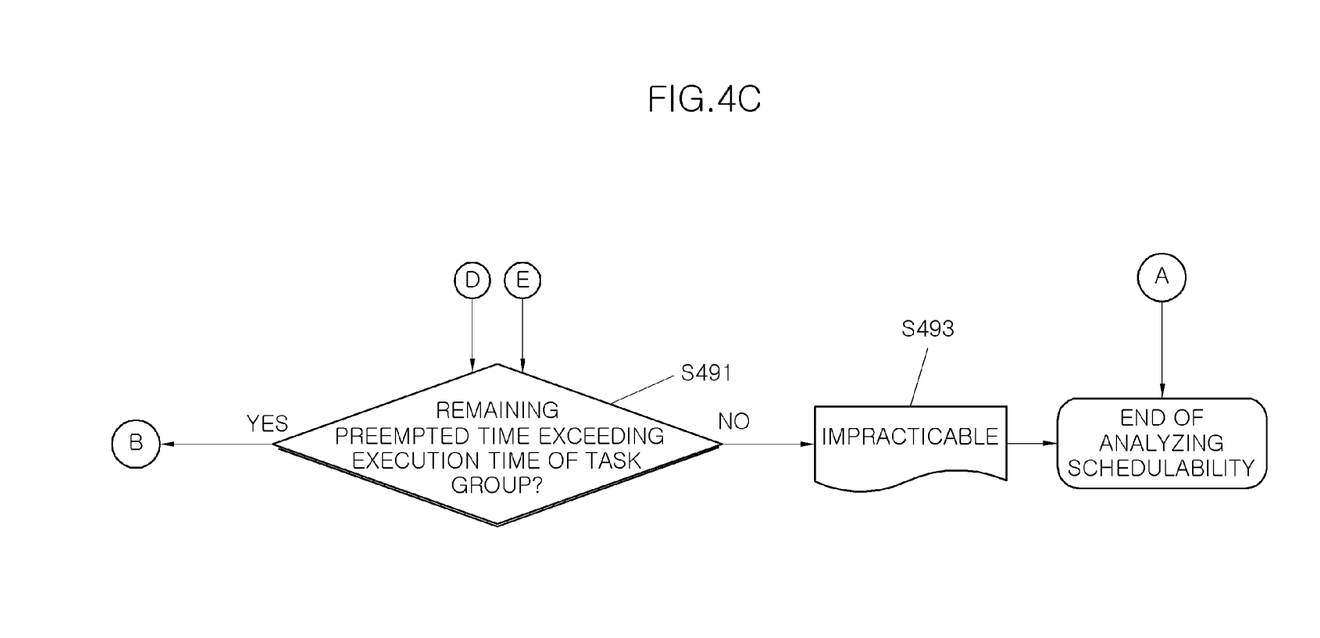

FIGS. 4A-4C are flow charts of the schedulability analysis according to the embodiment of the present invention. Referring to FIGS. 4A-4C, the schedulability analysis algorithm is performed by using the schedulability analysis subject set and the schedulability calculation subject set that are obtained by performing algorithms corresponding to FIGS. 2 and 3.

After collecting the schedulability analysis subject set and the schedulability calculation subject set, the schedulability analysis algorithm is performed by exploring the schedulability analysis subject set. When the schedulability analysis algorithm passes all the schedulability analysis subject set, then the schedulability is determined to be executable (S410, S420, and S421). The formula to determine the schedulability is as follows.

$$\lceil p_n \div p_k \rceil \times e_k \quad \text{[Formula 1]}$$

Herein, when k and n are natural numbers, a priority order of each task is shown in descending order. In other words, a task having top priority is expressed as $T_1$. Therefore, $T_k$ means a task having a kth priority. As the value of k increases, a task having kth priority has relatively low priority.

According to the above symbols, assuming that the schedulability analysis subject set that is analyzed by the schedulability analysis algorithm and is allowed to a CPU includes m tasks, and the schedulability calculation subject set includes l task groups, the schedulability calculation subject set is configured with $T_1$ to $T_l$ since the schedulability calculation subject set has higher priority than that of the schedulability analysis subject set. The schedulability analysis subject set is expressed as $T_{l+1}$ to $T_{l+m}$.

When a current subject of schedulability analysis has an nth priority, then a corresponding task is expressed as $T_n$, and $p_n$ refers to a period of $T_n$. A task group or a periodic real-time task having higher priority than the schedulability analysis subject is expressed as $T_k$. Wherein, k is a natural number between 1 and n. A period of $T_k$ is expressed as $p_k$, and an execution time of $T_k$ is expressed as $e_k$, then, an execution time used by $T_k$ during $p_k$ is as the formula 1.

Therefore, by using the formula 1, a total execution usage time of the periodic real-time task that has higher priority than the schedulability analysis subject during $p_n$, and an n−1 number of real-time task groups including the non-periodic real-time task may be expressed as follows.

$$\sum_{k=1}^{n-1} \lceil p_n \div p_k \rceil \times e_k <== p_n - e_n \quad \text{[Formula 2]}$$

Herein, according to the formula 1, $e_n$ refers to an execution time of $T_n$.

The schedulability analysis algorithm corresponding to the formula 2 is applied to all task groups within the schedulability analysis subject set. Also, periods and execution times of all schedulability analysis subjects are collected to calculate the schedulability analysis algorithm by exploring the schedulability calculation subject set (S430 and S440).

In steps S430 and S440, an execution time of schedulability analysis subject of current task group is added to the execution usage time by applying the formula 1 (S441).

When step S440 is completed, the schedulability analysis subjects are re-explored. The next step is performed when the re-exploration step is completed for all schedulability analysis subjects (S450 and S460).

In steps S450 and S460, a current subject of schedulability analysis that has the lowest priority but is higher than the top priority of the real-time task group is applied to the formula 1 and the obtained execution time is added to the execution usage time (S470, S480, and S490).

In addition, in step S470, when the re-explored subject of schedulability analysis is the same as the current subject of schedulability analysis, the corresponding subject is not considered to be included to the current subject of schedulability analysis, thus the re-exploration step S450 and step S460 are performed again.

Alternatively, in step S470, when the re-explored subject of schedulability analysis is not the same as the current subject id schedulability analysis, the top priority task of current subject of schedulability analysis is compared with the lowest priority task of the re-explored analysis subject in the step S480. When the lowest priority task of the re-explored subject of schedulability analysis is higher than the top priority task of current subject of schedulability analysis, an execution usage time of the lowest priority task of the re-explored subject of schedulability analysis is added to the execution usage time by applying to the formula 1 (S490). Then, steps S450 to S480 are repeated.

Alternatively, in step S480, when the lowest priority task of the re-explored subject of schedulability analysis is not higher than the top priority task of current subject of schedulability analysis, the corresponding task is applied to the schedulability analysis algorithm corresponding to the formula 2 by using the execution time thereof (S491).

Steps S470, S480, and S490 are repeated until the end of the re-exploration (S460), or until when the lowest priority task of the re-explored subject of schedulability analysis is lower than the top priority task of current subject of schedulability analysis (S480) since the schedulability analysis subjects are sorted in a descending order.

The required execution usage time calculated in steps S460 and S480 is compared with a remaining preempted time (S491). If the required execution usage time is smaller than the remaining time, step S410 that performs schedulability of next subject is performed, and steps S410 to S491 are repeated. Alternatively, if not, the schedulability analysis algorithm determines that it is impossible to perform the reserved resource of the corresponding task group within the period (S493).

The present invention is used for operating systems using both of a non-periodic real-time task group and a periodic real-time task. It is assumed that a Linux system among general operating systems is used to implement the present invention. Therefore, the corresponding algorithm may be applied to any operating systems satisfying the above condition.

What is claimed is:

1. A system for analyzing task group schedulability for hard real-time scheduling, the system comprising:
   an operating system including a file system and a kernel, wherein the operating system generates, from the file system and the kernel, non-periodic real-time task information and periodic real-time task information and periodic real-time task group information including the non-periodic real-time task information; and
   a tool for testing hard real-time schedulability, which collects the non-periodic real-time task information by applying a first predetermined scheduling algorithm and determines schedulability of a reserved resource for the periodic real-time task group information including the non-periodic real-time task information through a second predetermined scheduling algorithm,
   wherein the tool for testing hard real-time schedulability includes:
   a first module for collecting the non-periodic real-time task information, the first module collecting the periodic real-time task group information;
   a second module for collecting the periodic real-time task information; and
   a third module for testing schedulability, the third module determining the schedulability of the reserved resource for the periodic real-time task group information including the non-periodic real-time task information through the non-periodic real-time task information and the periodic real-time task information, and
   wherein the second algorithm determines the schedulability of the reserved resource for the periodic real-time task group information by using the periodic real-time task information including a period and an execution time of the periodic real-time task and priority information within the periodic real-time task group information, and by using the real-time task information allowed to a CPU.

2. The system of claim 1, wherein the first algorithm collects real-time task information including priorities by using a file system capable of accessing scheduling information including a period and an execution time of a task, or by using a system call.

3. The system of claim 1, wherein the second module explores an executing process from folders of the file system, determines if a task policy of the folder matches to a deadline scheduling policy, and if so, collects a period and an execution time of a task that corresponds to the executing process.

4. The system of claim 1, wherein the first module explores the real-time task group in the file system, explores priority information of a task within the real-time task group, and adds the explored real-time task group to a schedulability analysis subject set.

5. The system of claim 1, wherein the periodic real-time task group determines the priority of the task group based on the priority of the non-periodic real-time task in the group and the periodic real-time task group selects the highest priority and the lowest priority of the non-periodic real-time task in the group as the maximum and minimum priority of the periodic real-time task group, and the periodic real-time task group is sorted in a descending order based on the highest-priority information.

6. The system of claim 1, wherein the third module determines whether the non-periodic real-time task information and the periodic real-time task information correspond to a schedulability analysis subject set or to a schedulability calculation subject set, adds the determined subject set to the corresponding subject set,
   performs a schedulability analysis algorithm by exploring the schedulability analysis subject set from beginning to end,
   determines the schedulability of the schedulability analysis subject set at the last schedulability analysis subject set, and
   when the schedulability analysis subject set is determined to be impracticable, determines that the schedulability of the reserved resource for the real-time task group is impracticable.

7. The system of claim 6, each schedulability analysis subject in the schedulability analysis subject set is always a schedulability analysis operation object having a relatively high priority, and the schedulability analysis operation is performed by calculating other schedulability analysis objects having the highest priority higher than the minimum priority of the schedulability analysis subject in the schedulability object analysis set as CPU resource usage in the worst case.

8. The system of claim 6, wherein the real-time task group includes a non-periodic real-time task with high priority, and the third module determines
   the schedulability of the reserved resource for the real-time task group by comparing a remaining time of a preempted time that is preempted by the real-time task group including the non-periodic real-time task allowed to a CPU or the real-time task group including non-periodic real-time task with a higher priority than the periodic real-time task, and the periodic real-time task, with an execution time required to execute the corresponding real-time group.

9. The system of claim 8, wherein the execution time of the real-time task group is calculated by the following formula:

$$\sum_{k=1}^{n-1} \lceil p_n \div p_k \rceil \times e_k <== p_n - e_n$$

(Wherein, when k and n are natural numbers, a priority order of each task is shown in descending order, in other words, a task having top priority is expressed as $T_1$, therefore, $T_k$ means a task having a kth priority, as the value of k increases, a task having kth priority has relatively low priority, when a current subject of schedulability analysis has an nth priority, then a corresponding task is expressed as $T_n$, $p_n$ refers to a period of $T_n$, and $e_n$ refers to an execution time of $T_n$, a task group or a periodic real-time task having higher priority than the schedulability analysis subject is expressed as $T_k$, a period of $T_k$ is expressed as $p_k$, and an execution time of $T_k$ is expressed as $e_k$, wherein, k is a natural number between 1 and n).

10. A method of analyzing schedulability of a task group for hard real-time scheduling, wherein the method uses an operating system including a file system and a kernel and is performed by a tool for testing hard real-time schedulability, the method comprising:
- generating non-periodic real-time task information and periodic real-time task information and periodic real-time task group information including the non-periodic real-time task information from the file system and the kernel;
- collecting the non-periodic real-time task information by applying a first predetermined scheduling algorithm; and
- determining schedulability of a reserved resource for the periodic real-time task group information including the non-periodic real-time task information by applying a second predetermined scheduling algorithm,
- wherein the tool for testing hard real-time schedulability includes:
  - a first module for collecting the non-periodic real-time task information, the first module collecting the periodic real-time task group information;
  - a second module for collecting the periodic real-time task information; and
  - a third module for testing schedulability, the third module determining the schedulability of the reserved resource for the periodic real-time task group information including the non-periodic real-time task information through the non-periodic real-time task information and the periodic real-time task information, and
- wherein the second algorithm determines the schedulability of the reserved resource for the periodic real-time task group information by using the periodic real-time task information including a period and an execution time of the periodic real-time task and priority information within the periodic real-time task group information, and by using the real-time task information allowed to a CPU.

\* \* \* \* \*